United States Patent
Lai et al.

(10) Patent No.: US 9,569,414 B2
(45) Date of Patent: *Feb. 14, 2017

(54) METHOD, FRAMEWORK, AND PROGRAM PRODUCT FOR FORMATTING AND SERVING WEB CONTENT

(71) Applicant: International Business Machines Corporation, Armonk, NY (US)

(72) Inventors: Jennifer Lai, Garrison, NY (US); Zhiqiang Liu, Duluth, GA (US); Brian J. McDonald, Minneapolis, MN (US); Laurie Miller, Lyons, CO (US); Yael Ravin, Mount Kisco, NY (US); Karen A. Ughetta, Salem, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/602,460

(22) Filed: Jan. 22, 2015

(65) Prior Publication Data
US 2015/0134736 A1    May 14, 2015

Related U.S. Application Data

(60) Continuation of application No. 13/571,003, filed on Aug. 9, 2012, now Pat. No. 8,972,932, which is a
(Continued)

(51) Int. Cl.
*G06F 9/44* (2006.01)
*G06F 17/22* (2006.01)
(Continued)

(52) U.S. Cl.
CPC ......... *G06F 17/2247* (2013.01); *G06F 9/4443* (2013.01); *G06F 9/45529* (2013.01); *H04L 67/42* (2013.01)

(58) Field of Classification Search
CPC   G06F 17/2247; G06F 9/4443; G06F 9/45529; G06F 8/33; G06F 8/71; G06F 8/38
(Continued)

(56) References Cited

U.S. PATENT DOCUMENTS 6,189,137 B1    2/2001  Hoffman
6,620,204 B1    9/2003  Malcolm
(Continued)

OTHER PUBLICATIONS

Pham, Office Action Communication for U.S. Appl. No. 11/835,768 dated Mar. 13, 2012, 18 pages.
(Continued)

*Primary Examiner* — Anna Deng
(74) *Attorney, Agent, or Firm* — Maeve McCarthy; Hoffman Warnick LLC

(57) ABSTRACT

The present invention provides an approach and corresponding framework that separates data from its formatting/view by generating the dynamic JavaScript (data) as a set (e.g., at least one) of JavaScript (data) objects, without any HTML formatting. Then, a set of JavaScript functions can be created that takes the set of JavaScript objects as a parameter, and outputs all or a subset of this data object in a format determined by this JavaScript function. In general, these formatting functions can be static, rather than dynamic, JavaScript. This approach has the advantage of providing a much greater degree of formatting flexibility, without the need for each new format to establish a connection with the back-end system providing the data.

5 Claims, 3 Drawing Sheets

Related U.S. Application Data division of application No. 11/835,768, filed on Aug. 8, 2007, now Pat. No. 8,316,348.

(51) Int. Cl.
*G06F 9/455* (2006.01)
*H04L 29/06* (2006.01)

(58) Field of Classification Search
USPC .......................................................... 717/110
See application file for complete search history.

(56) References Cited

U.S. PATENT DOCUMENTS

| | | |
|---|---|---|
| 6,701,514 B1 | 3/2004 | Haswell et al. |
| 6,865,593 B1 | 3/2005 | Reshef et al. |
| 7,171,670 B2 | 1/2007 | Motoyama et al. |
| 7,376,653 B2 | 5/2008 | Hart, III |
| 7,406,498 B2 | 7/2008 | Reshef et al. |
| 7,680,883 B2 | 3/2010 | Reshef et al. |
| 8,001,551 B2 | 8/2011 | LeRoy et al. |
| 2002/0154172 A1 | 10/2002 | Linsey et al. |
| 2003/0172197 A1 | 9/2003 | Dencker et al. |
| 2005/0262037 A1 | 11/2005 | Christensen et al. |
| 2005/0262070 A1* | 11/2005 | Christensen ...... G06F 17/30893 |
| 2006/0015842 A1 | 1/2006 | DeSantis |
| 2007/0174486 A1 | 7/2007 | Holstege |
| 2007/0266176 A1* | 11/2007 | Wu ..................... G06F 17/2247 709/242 |

OTHER PUBLICATIONS

Pham, Notice of Allowance and Fee(s) Due for U.S. Appl. No. 11/835,768 dated Jul. 13, 2012, 16 pages.

Deng, Non-Final Rejection for U.S. Appl. No. 13/571,003 dated Apr. 7, 2014, 14 pages.

Deng, Final Rejection for U.S. Appl. No. 13/571,003 dated Aug. 5, 2014, 13 pages.

Deng, Notice of Allowance and Fee(s) Due for U.S. Appl. No. 13/571,003 dated Oct. 22, 2014, 10 pages.

\* cited by examiner

| int | String | String | float | int | float | float | float | boolean | boolean | Date | Date | ValuesList |
|---|---|---|---|---|---|---|---|---|---|---|---|---|
| id | type | address | price | bedrooms | bathrooms | lotsize | size | hasBasement | finished | dateBuilt | dateAvailable | rooms |

| 10201 | Single Family Home | 1001 Lucky Lake Drive, Kennesaw, Georgia 30152 | 499000 | 4 | 3.5 | 0.55 | 3200 | true | false | Wed May 20 12:52:55 EDT 1998 | Fri Aug 11 12:52:55 EDT 2006 | (see rooms table below) | rooms (for id 10201):

| String | float | int | String | String |
|---|---|---|---|---|
| name | size | windows | floor-type | other-description |
| Bedroom | 250 | 2 | carpet | walkin closet |
| Bedroom | 310 | 3 | carpet | walkin closet |
| Bedroom | 200 | 1 | carpet | closet |
| Bedroom | 180 | 1 | carpet | closet |
| Bathroom | 150 | 1 | granite tile | jet bathtub and shower |
| Bathroom | 120 | 1 | granite tile | bathtub and shower |
| Bathroom | 100 | 0 | ceramic tile | bathtub and shower |
| Bathroom | 80 | 1 | vinyl | no shower |
| Mediaroom | 210 | 1 | hardwood | bose system |
| studyroom | 112 | 1 | hardwood | built-in bookshelf |

| 10205 | Town House | 332 Cloud Drift Lane, Atlanta, Georgia 30002 | 159000 | 2 | 2 | 0.24 | 1180 | false | false | Thu Oct 6 12:52:55 EDT 1988 | Fri Jun 23 12:52:55 EDT 2006 | (see rooms table below) | rooms (for id 10205):

| String | float | int | String | String |
|---|---|---|---|---|
| name | size | windows | floor-type | other-description |
| Bedroom | 210 | 1 | carpet | walkin closet |
| Bedroom | 180 | 1 | carpet | closet |
| Bathroom | 140 | 1 | ceramic tile | bathtub and shower |
| Bathroom | 80 | 0 | ceramic tile | NULL |

FIG. 2

| String | ValuesList | | | | | |
|---|---|---|---|---|---|---|
| description | items | | | | | |
| each individual row can contain different objects | NULL | | | | | |
| this row has two circles | String | float | | | | |
| | type | radius | | | | |
| | Circle | 1.5 | | | | |
| | Circle | 3.14 | | | | |
| this row has three ellipses | String | float | float | | | |
| | type | majoraxis | minoraxis | | | |
| | Ellipse | 8 | 6 | | | |
| | Ellipse | 11.2 | 7 | | | |
| | Ellipse | 13.14 | 11.11 | | | |
| this row has one rectangle | String | float | float | | | |
| | type | len | width | | | |
| | Rectangle | 4.1 | 5.3 | | | |
| this row has one triangles | String | float | float | float | | |
| | type | side1 | side2 | side3 | | |
| | Triangle | 3 | 5 | 4 | | |
| | Triangle | 11 | 13 | 17 | | |

FIG. 3

METHOD, FRAMEWORK, AND PROGRAM PRODUCT FOR FORMATTING AND SERVING WEB CONTENT

FIELD OF THE INVENTION

The present invention generally relates to formatting and serving of web content. Specifically, the present invention relates to the conglomeration, management and control of dynamic web content.

BACKGROUND OF THE INVENTION

The use of a JavaScript library that contains dynamically generated content is a relatively new approach to embedding content on a web page. This approach has many labels, including JavaScript syndication and web content syndication. It also has several advantages. For example, because this approach requires no back-end integration, a web page developer simply embeds a URL to a JavaScript library and the dynamic content is added. This significantly reduces the complexities required to integrate third party content into a page. Because there is no back-end integration, there is no need to worry about software compatibility between the server generating the web page and the server generating the JavaScript library to embed the content. Also, there is no need for the web page developer to access an API to integrate the embedded content into the web page. The integration occurs when the page is rendered by the browser, not when the HTML is being generated on the web server.

Typically, the dynamically generated JavaScript library provides a function to embed its content of this library directly on the web page. Optionally, CSS (or similar technology) is used to adjust the 'look and feel' of the content to more closely match that of the included page. A disadvantage of this approach is that if the formatting provided by the JavaScript library does not provide the formatting desired for the including page, then a new dynamically generated JavaScript library must be created. This additional JavaScript library passes the same or similar content as the first JavaScript library, but formats the output in a different way. As more variations of this dynamically generated JavaScript library are created for various formats, maintaining updates across all variations can become difficult to maintain. Also, every additional dynamically generated JavaScript library must interface with whatever back-end system is providing the data.

In view of the foregoing, there exists a need for an approach that solves at least one of the deficiencies in the related art.

SUMMARY OF THE INVENTION

In general, the present invention provides an approach and corresponding framework that separates data from its formatting/view by generating the dynamic JavaScript (data) as a set (e.g., at least one) of JavaScript (data) objects, without any HTML formatting. Then, a set of JavaScript functions can be created that takes the set of JavaScript objects as a parameter, and outputs all, or a subset, of this data object in a format determined by this JavaScript function. In general, these formatting functions can be static, rather than dynamic, JavaScript. This approach has the advantage of providing a much greater degree of formatting flexibility, without the need for each new format to establish a connection with the back-end system providing the data. This separation of data and format also allows for the possibility of the dynamically generated set of JavaScript objects to be obtained from one server while the set of JavaScript functions used for formatting be obtained from an entirely different server. In a typical embodiment, the set of JavaScript functions are written in a way that is compatible with the format of the dynamically generated set of JavaScript objects being passed as a parameter. As the data format changes, the HTML formatting JavaScript function can change too.

A first aspect of the present invention provides a method for formatting and serving web content, comprising: providing a set of JavaScript objects that represents dynamic JavaScript data; providing a set of JavaScript functions to format the set of JavaScript objects, the set of JavaScript objects being distinct from the set of JavaScript functions; and formatting the set of JavaScript objects using the set of JavaScript functions.

A second aspect of the present invention provides a framework for formatting and serving web content, comprising: a data conglomeration engine for receiving and processing data conglomeration requests, and for serving requested data conglomeration services; a services registration database for storing data conglomeration service metadata; a data conglomeration services module for maintaining a set of data conglomeration services, the data conglomeration services module interfacing with the data conglomeration engine via a data conglomeration services interface; a data conglomeration configuration repository for storing data conglomeration engine configurations and data conglomeration service configurations; and a source manager for interfacing with static and dynamic data sources that are accessed in response to the data conglomeration requests.

A third aspect of the present invention provides a program product stored on a computer readable medium for formatting and serving web content, the computer readable medium comprising program code for causing a computer system to: receive and process a data conglomeration request into a data conglomeration service call; obtain data in response to the data conglomeration service call; utilize a set of JavaScript objects to represent the data as JavaScript data; format the set of JavaScript objects using a set of JavaScript functions; and serve formatted JavaScript objects as web content to a caller issuing the data conglomeration request.

A fourth aspect of the present invention provides a method for deploying a system for formatting and serving web content, comprising: providing a computer infrastructure being operable to: receive and process a data conglomeration request into a data conglomeration service call; obtain data in response to the data conglomeration service call; utilize a set of JavaScript objects to represent the data as JavaScript data; format the set of JavaScript objects using a set of JavaScript functions; and serve formatted JavaScript objects as web content to a caller issuing the data conglomeration request.

A fifth aspect of the present invention provides a computer-implemented business method for formatting and serving web content, comprising: receiving and processing a data conglomeration request into a data conglomeration service call; obtaining data in response to the data conglomeration service call; utilizing a set of JavaScript objects to represent the data as JavaScript data; formatting the set of JavaScript objects using a set of JavaScript functions; and serving formatted JavaScript objects as web content to a caller issuing the data conglomeration request.

A sixth aspect of the present invention provides computer software embodied in a propagated signal for formatting and serving web content, the computer software comprising instructions for causing a computer system to: receive and process a data conglomeration request into a data conglomeration service call; obtain data in response to the data conglomeration service call; utilize a set of JavaScript objects to represent the data as JavaScript data; format the set of JavaScript objects using a set of JavaScript functions; and serve formatted JavaScript objects as web content to a caller issuing the data conglomeration request.

A seventh aspect of the present invention provides a data processing system for formatting and serving web content, comprising a memory medium having instructions, a bus coupled to the memory medium, and a processor coupled to the bus that when executing the instructions cause the data processing system to: receive and process a data conglomeration request into a data conglomeration service call; obtain data in response to the data conglomeration service call; utilize a set of JavaScript objects to represent the data as JavaScript data; format the set of JavaScript objects using a set of JavaScript functions; and serve formatted JavaScript objects as web content to a caller issuing the data conglomeration request.

BRIEF DESCRIPTION OF THE DRAWINGS

These and other features of this invention will be more readily understood from the following detailed description of the various aspects of the invention taken in conjunction with the accompanying drawings in which:

FIG. 2 depicts an illustrative ValuesList on a web page according to the present invention.

FIG. 3 depicts illustrative data served n a web page according to the present invention.

Figure 1:
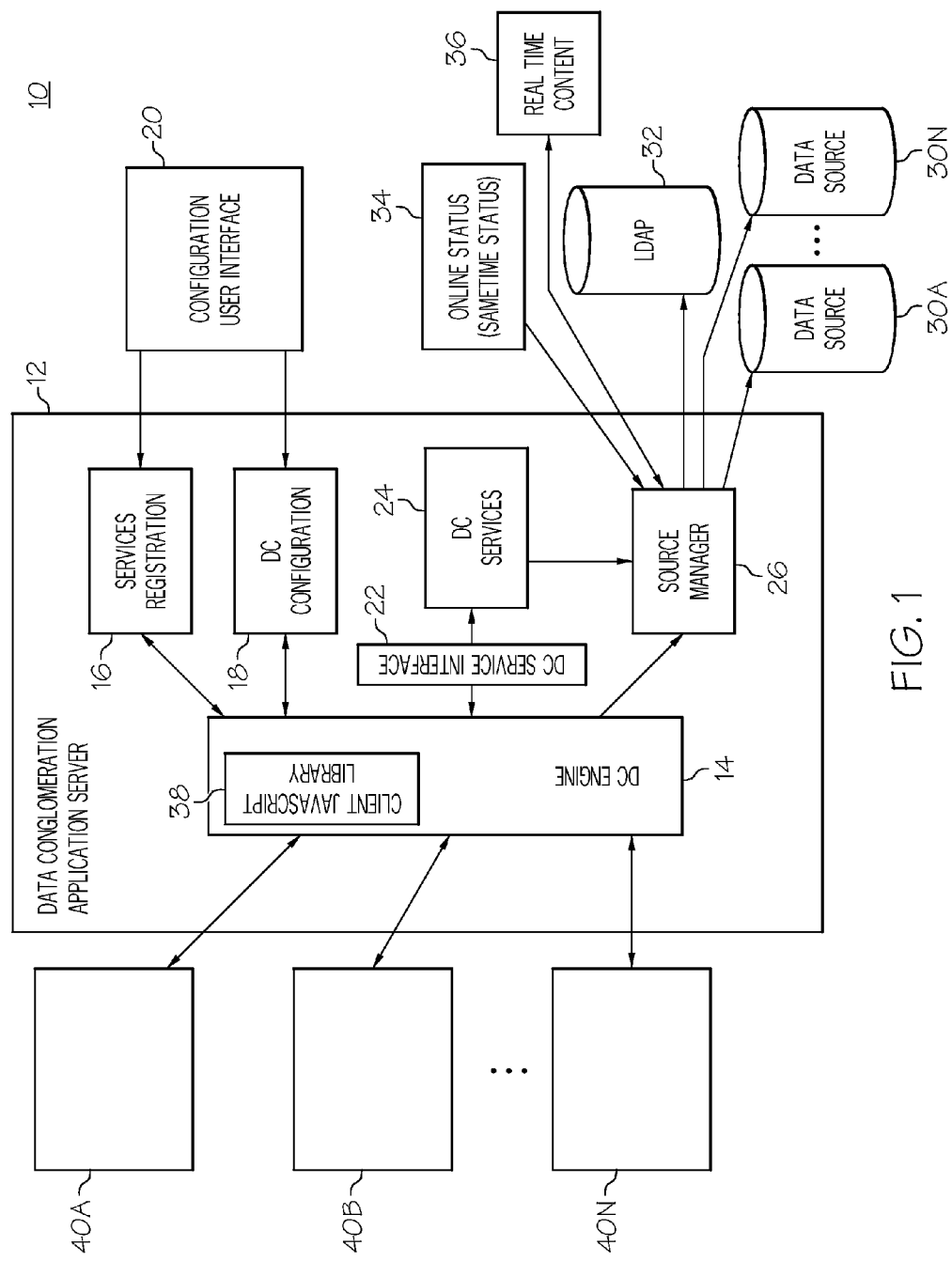
FIG. 1 depicts an illustrative framework for formatting and serving web content according to the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the Invention will have the following sections:
I. General Description
II. Expert and Knowledge Tracker
III. Computerized Implementation I. General Description In general, the present invention provides an approach and corresponding framework that separates data from its formatting/view by generating the dynamic JavaScript (data) as a set (e.g., at least one) of JavaScript (data) objects, without any HTML formatting. Then, a set of JavaScript functions can be created that takes the set of JavaScript object as a parameter, and outputs all or a subset of this data object in a format determined by this JavaScript function. In general, these formatting functions can be static, rather than dynamic, JavaScript. This approach has the advantage of providing a much greater degree of formatting flexibility, without the need for each new format to establish a connection with the back-end system providing the data. This separation of data and format also allows for the possibility of the dynamically generated set of JavaScript objects to be obtained from one server while the set of JavaScript functions used for formatting be obtained from an entirely different server. In a typical embodiment, the set of JavaScript functions are written in a way that is compatible with the format of the dynamically generated set of JavaScript objects being passed as a parameter. As the data format changes, the HTML formatting JavaScript function can change too.

For clarity, the technique of combining data elements from different data sources into a single data content will be referred to herein as Data Conglomeration, or DC. In addition, the data format representing the DC content will be referred to herein as ValuesList. In any event, an aspect of this invention is to provide a framework to integrate DC Services to stream dynamic content from different data sources to any web site, and to update portions of the web page. In an illustrative embodiment, the data format of choice being used is ValuesList, which will be explained in detail. The technique used to dynamically refresh content is dynamic JavaScript reload and callback to process the data in JavaScript.

Some advantages of this invention are that: it allows a page to request dynamic content and automatic update portion of the page when the content is changed on a timely basis; it provides an interface to register installable services; it uses an innovative data structure (ValuesList) to map any server side data to web client; it provides an interface for user to dynamically pick and choose and configure the data elements from different data sources to be sent to the client; under the present invention, server side configuration changes will be reflected immediately on the next service call; it provides an interface or configuration file to setup different data sources; and, it provides a standard client JavaScript library to make server calls and parse and process the result data format.

Referring now to FIG. 1, a DC server framework 10 according to the present invention is shown. It should be understood in advance that framework 10 can be implemented in a number of ways. All components could be implemented and deployed on a single application server such as DC application server 12. However, many or all of these components could also be implemented on entirely separate servers, connected via network interfaces.

In a typical embodiment, DC Server Framework 10 includes the following components:

DC Engine 14: A program responsible for serving requested DC services. DC Engine acts as a controller for incoming requests. It breaks down a request and translates requested methods and parameters into a matching DC Service call. If the caller is a web page, the resulting ValuesList is encoded as a JavaScript String, and sent back to the client. The calling web page may pass a callback JavaScript function name, that function will be called when the request is returned. If the caller is an application, the engine has the option to encode the resulting ValuesList into Web Service XML.

Services Registration Database 16: A database that stores the DC Service metadata (e.g., method name, parameters). Services can be added or removed from the registry. This allows people to find new services easily and develop new web pages or applications to utilize them.

DC Configuration Repository 18: A configuration repository that holds DC Engine configurations and DC Service configurations. DC Configuration Repository 18 is used by DC Engine 14 to gather additional parameters such as SQL statement, attribute list for LDAP, search criteria, and/or simple list of data elements for each DC Service. This allows the user to define in detail what data elements are included and how data elements are fetched from each data source for DC Service.

Configuration User Interface 20: A user interface to DC configuration repository 18 and Service Registration module 16. It can be used by DC Administrators to register new services and configure the service parameters and list of data elements.

DC Service Interface 22: An agreed interface between DC Engine 14 and DC Services module 24. All DC Services implement this interface. DC calls each service through this common interface. In this interface, the resulting data format returned to the caller is always the same. The data format is flexible enough to allow for easy addition and subtraction of data elements from different data sources. The data format is simple and mirrors a table representation but can grow in depth to handle more complexity.

DC Services module 24: A module that hold/maintains DC Services that are a set of services built according to DC Service Interface 22. Each DC Service is an installable component that can be installed through Configuration User Interface 20.

Source Manager 26: Source manager 26 maintains all static and dynamic data sources. It can also provide interfaces to databases 30A-N of preexisting web content, LDAPs 32, online statuses 34, real-time web content 36, etc.

Date Source 30: The data source such as database, LDAP, some real time content, user online status, etc.

Client Component 38: The client component comprises a JavaScript library that contains the JavaScript objects and JavaScript functions. Specifically, there are JavaScript functions to make a client call to server from any web page 40A-N. There are JavaScript functions to parse and process the resulting encoded String into common data format ValuesList. FIG. 2 depicts examples of real ValuesList showings on web pages. ValuesList is a table like presentation of data and one can view them as rows and columns. ValuesList has a column name and type to describe a column. The content can be stored as columns or rows. As depicted, the data types are all mapped to JavaScript primitive types and internal object types such as number (float), integer, String, Boolean, Date. One advantage of ValuesList is that its columns can contain ValuesList type thus giving it great ability to recursive down to complex data structures. Another example is shown in FIG. 3 that depicts illustrative data on a web page.

Using framework 10 of FIG. 1, the present invention provides a way to format and serve web content by: receiving and processing a data conglomeration request into a data conglomeration service call; obtaining data in response to the data conglomeration service call; utilizing a set of JavaScript objects to represent the data as JavaScript data; formatting the set of JavaScript objects using a set of JavaScript functions; and serving formatted JavaScript objects as web content to a caller issuing the data conglomeration request.

II. Expert and Knowledge Tracker

The present invention also provides an Expert and Knowledge Tracker that is an application that allows users/learners to chat real-time with experts about questions that pertain directly to that expert's area of expertise, and it retains and shows questions that have already been asked and answered. The application has been written to best serve the expert (as well as the user/learner) to encourage experts to share their knowledge—with features that will engage the busiest experts and allow them to disseminate information in the fastest way and the fewest times possible. Below is the workflow from the expert's point of view:

Set "office hours" to appear as available to users/learners, using the expert's instant messaging status. There are four ways to achieve this (to accommodate different working styles). Note that options 1, 2, and 3 allow an expert to be using their instant messaging services but NOT appear as available to learners if desired:

1. Ad hoc—simply tell the Expert Tracker bot one is available "now" and then turn off this function when no longer available.
2. Calendar schedule—use calendar function in office software to set times when to be available. At those times, if the expert is logged into instant messaging, s/he will appear as available during those times.
3. Web schedule—use web function to set times when to be available. At those times, if the expert is logged into instant messaging, s/he will appear as available during those times.
4. Default to instant messaging—use the expert's instant messaging status to determine availability.

When a learner wants to chat, s/he sees the expert's actual availability (which is updated real-time). The learner and the expert receive an instant message asking them to join a session. The learner and expert chat. At the end of the chat session, both the learner and the expert receive a short questionnaire, asking for the perceived value of the chat, whether the chat can be stored for future use, and for any other comments either may have.

The expert receives periodical reports of how much time s/he has spent in chats, what the value has been, the content of saved chats, and any other comments supplied. The expert can therefore have an accurate record of his/her participation and the value of that participation to IBM.

The expert is able to review all chats and pick any to decide if s/he wants to turn the chat into a publishable FAQ. The question the learner asked is placed in the "Q" field and the rest of the chat session is placed in the "A" field. The expert may edit the Q and A as desired, and then hit "publish". The FAQ may be published anywhere, but at least on the page where the learner sees him/her available to chat, so that if the question the learner has matches an existing FAQ, the expert is not asked that question again.

III. Computerized Implementation

It should be understood that any of the teachings of the present invention the present invention could be deployed on one or more computing devices (e.g., servers, clients, etc.) within a computer infrastructure. This is intended to demonstrate, among other things, that the present invention could be implemented within a network environment (e.g., the Internet, a wide area network (WAN), a local area network (LAN), a virtual private network (VPN), etc.), or on a stand-alone computer system. In the case of the former, communication throughout the network can occur via any combination of various types of communications links. For example, the communication links can comprise addressable connections that may utilize any combination of wired and/or wireless transmission methods. Where communications occur via the Internet, connectivity could be provided by conventional TCP/IP sockets-based protocol, and an Internet service provider could be used to establish connectivity to the Internet. Still yet, the computer infrastructure is intended to demonstrate that some or all of the components of such an implementation could be deployed, managed, serviced, etc. by a service provider who offers to implement, deploy, and/or perform the functions of the present invention for others.

Where computer hardware is provided, it is understood that such any computers utilized will include standard elements such as a processing unit, a memory medium, a bus coupling the memory medium to the bus, input/output (I/O) interfaces coupled to the bus, etc. Further, such computer system(s) can be in communication with external I/O devices/resources. In general, processing units execute computer program code such as one or more of the components depicted in FIG. 1 to provide the functionality described above, which is stored are memory medium(s). While executing computer program code, the processing unit can read and/or write data to/from memory, I/O interfaces, etc. The bus provides a communication link between each of the components in a computer. External devices can comprise any device (e.g., keyboard, pointing device, display, etc.) that enable a user to interact with the computer system and/or any devices (e.g., network card, modem, etc.) that enable the computer to communicate with one or more other computing devices.

The hardware used to implement the present invention can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively. Moreover, the processing unit therein may comprise a single processing unit, or be distributed across one or more processing units in one or more locations, e.g., on a client and server. Similarly, the memory medium can comprise any combination of various types of data storage and/or transmission media that reside at one or more physical locations. Further, the I/O interfaces can comprise any system for exchanging information with one or more external device. Still further, it is understood that one or more additional components (e.g., system software, math co-processing unit, etc.) can be included in the hardware.

While shown and described herein as a method, framework, and program product for formatting and serving web content, it is understood that the invention further provides various alternative embodiments. For example, in one embodiment, the invention provides a computer-readable/useable medium that includes computer program code to enable a computer infrastructure to format and serve web content. To this extent, the computer-readable/useable medium includes program code that implements the process(es) of the invention. It is understood that the terms computer-readable medium or computer useable medium comprises one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a business method that performs the process of the invention on a subscription, advertising, and/or fee basis. That is, a service provider, such as a Solution Integrator, could offer to process images. In this case, the service provider can create, maintain, support, etc., a computer infrastructure, such as computer infrastructure that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for serving and formatting web content. In this case, a computer infrastructure, such as a computer infrastructure can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code or notation, of a set of instructions intended to cause a computing device having an information processing capability to perform a particular function either directly or after either or both of the following: (a) conversion to another language, code or notation; and/or (b) reproduction in a different material form. To this extent, program code can be embodied as one or more of: an application/software program, component software/a library of functions, an operating system, a basic I/O system/driver for a particular computing and/or I/O device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or I/O devices (including, but not limited to, keyboards, displays, pointing devices, etc.) can be coupled to the system either directly or through intervening I/O controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems and Ethernet cards.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

We claim:

1. A method for formatting and serving web content, the method performed by a processor comprising:
   requesting a set of JavaScript objects and a set of JavaScript functions in a single Hypertext Transfer Protocol (HTTP) request; and
   in response to the requesting:
      obtaining the set of JavaScript objects that represents dynamic JavaScript data; and
      obtaining the set of JavaScript functions to format the set of JavaScript objects, the set of JavaScript objects being distinct from the set of JavaScript functions; and
   formatting the set of JavaScript objects using the set of JavaScript functions as a parameter; and
   outputting at least a subset of the set of JavaScript objects in a format determined by the set of JavaScript functions.

2. The method of claim 1, the set of JavaScript objects and the set of JavaScript functions being contained in a common JavaScript library.

3. The method of claim 2, the common JavaScript library being accessible by a data conglomeration engine, the data conglomeration engine serving the set of JavaScript objects.

4. The method of claim 3, the common JavaScript library being for matched content streams and Hypertext Markup Language (HTML) skins.

5. The method of claim 1, wherein the set of JavaScript objects is requested from and contained on a first server and the set of JavaScript functions is requested from and contained on a second server.

* * * * *

(12) EX PARTE REEXAMINATION CERTIFICATE (220th)
Ex Parte Reexamination Ordered under 35 U.S.C. 257

United States Patent
Lai et al.

(10) Number: US 9,569,414 C1
(45) Certificate Issued: Mar. 28, 2023

(54) METHOD, FRAMEWORK, AND PROGRAM PRODUCT FOR FORMATTING AND SERVING WEB CONTENT

(71) Applicant: International Business Machines Corporation, Armonk, NY (US)

(72) Inventors: Jennifer Lai, Garrison, NY (US); Zhiqiang Liu, Duluth, GA (US); Brian J. McDonald, Minneapolis, MN (US); Laurie Miller, Lyons, CO (US); Yael Ravin, Mount Kisco, NY (US); Karen A. Ughetta, Salem, VA (US)

(73) Assignee: INTERNATIONAL BUSINESS MACHINES CORPORATION, Armonk, NY (US)

Supplemental Examination Request:
No. 96/000,395, Apr. 8, 2022

Reexamination Certificate for:
Patent No.: 9,569,414
Issued: Feb. 14, 2017
Appl. No.: 14/602,460
Filed: Jan. 22, 2015

Related U.S. Application Data

(60) Continuation of application No. 13/571,003, filed on Aug. 9, 2012, now Pat. No. 8,972,932, which is a division of application No. 11/835,768, filed on Aug. 8, 2007, now Pat. No. 8,316,348.

(51) Int. Cl.
G06F 9/455 (2018.01)
G06F 9/451 (2018.01)
G06F 40/143 (2020.01)
H04L 67/01 (2022.01)

(52) U.S. Cl.
CPC .......... *G06F 9/45529* (2013.01); *G06F 9/451* (2018.02); *G06F 40/143* (2020.01); *H04L 67/01* (2022.05)

(58) Field of Classification Search
None
See application file for complete search history.

(56) References Cited

To view the complete listing of prior art documents cited during the supplemental examination proceeding and the resulting reexamination proceeding for Control Number 96/000,395, please refer to the USPTO's Patent Electronic System.

*Primary Examiner* — Eron J Sorrell

(57) ABSTRACT

The present invention provides an approach and corresponding framework that separates data from its formatting/view by generating the dynamic JavaScript (data) as a set (e.g., at least one) of JavaScript (data) objects, without any HTML formatting. Then, a set of JavaScript functions can be created that takes the set of JavaScript objects as a parameter, and outputs all or a subset of this data object in a format determined by this JavaScript function. In general, these formatting functions can be static, rather than dynamic, JavaScript. This approach has the advantage of providing a much greater degree of formatting flexibility, without the need for each new format to establish a connection with the back-end system providing the data.

Attention is directed to the decision of 1:21cv1319 *Chewy Inc. v. International Business Machines,* (S.D.N.Y.), Apr. 29, 2022 relating to this patent. This reexamination may not have resolved all questions raised by this decision. See 37 CFR 1.552(c) for *ex parte* reexamination and 37 CFR 1.906(c) for *inter partes* reexamination.

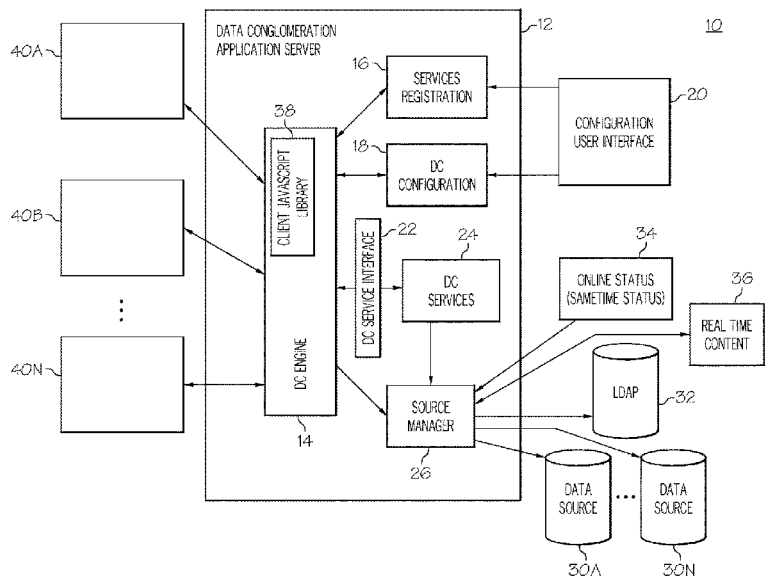

EX PARTE REEXAMINATION CERTIFICATE

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1-5 are cancelled.

New claims 6-10 are added and determined to be patentable.

6. *A method for formatting and serving web content, the method performed by a processor comprising:*

*requesting a set of JavaScript objects and a set of JavaScript functions in a single Hypertext Transfer Protocol (HTTP) request; and*

*in response to the requesting:*
   *obtaining the set of JavaScript objects that represents dynamic JavaScript data; and*
   *obtaining the set of JavaScript functions to format the set of JavaScript objects, the set of JavaScript objects being distinct from the set of JavaScript functions; and*
   *formatting the set of JavaScript objects using the set of JavaScript functions, the set of JavaScript functions taking the set of JavaScript objects as a parameter; and*
   *outputting at least a subset of the set of JavaScript objects in a format determined by the set of JavaScript functions.*

7. *The method of claim 6, the set of JavaScript objects and the set of JavaScript functions being contained in a common JavaScript library.*

8. *The method of claim 7, the common JavaScript library being accessible by a data conglomeration engine, the data conglomeration engine serving the set of JavaScript objects.*

9. *The method of claim 8, the common JavaScript library being for matched content streams and Hypertext Markup Language (HTML) skins.*

10. *The method of claim 6, wherein the set of JavaScript objects is requested from and contained on a first server and the set of JavaScript functions is requested from and contained on a second server.*

* * * * *